United States Patent [19]

Arfaei et al.

[11] Patent Number: 4,946,506

[45] Date of Patent: * Aug. 7, 1990

[54] CORROSION INHIBITING HYDRAULIC CEMENT ADDITIVES AND COMPOSITIONS CONTAINING SAME

[75] Inventors: Ahmad Arfaei, Milford, N.H.; Neal S. Berke, Chelmsford, Mass.; Michael P. Dallaire, Dover, N.H.; Maria Hicks, Newton, Mass.

[73] Assignee: W.R. Grace & Co.-Conn., Lexington, Mass.

[ * ] Notice: The portion of the term of this patent subsequent to Mar. 21, 2006 has been disclaimed.

[21] Appl. No.: 404,157

[22] Filed: Sep. 7, 1989

[51] Int. Cl.$^5$ .............................................. C04B 24/32
[52] U.S. Cl. ..................... 106/724; 106/725; 106/802; 106/809; 524/4; 524/5; 524/401
[58] Field of Search .................. 106/90, 314, 315, 89, 106/90, 92; 524/4, 5

[56] References Cited

U.S. PATENT DOCUMENTS

| | | | |
|---|---|---|---|
| 3,427,175 | 2/1969 | Angstadt et al. | 106/89 |
| 4,092,109 | 5/1978 | Rosenberg et al. | 21/2.5 R |
| 4,229,224 | 10/1980 | Dawson et al. | 106/90 |
| 4,285,733 | 8/1981 | Rosenberg et al. | 106/98 |
| 4,318,774 | 3/1982 | Dodson | 106/90 |
| 4,466,834 | 8/1984 | Dodson et al. | 106/89 |
| 4,676,317 | 6/1987 | Fry et al. | 106/90 |
| 4,814,014 | 3/1989 | Arafaei | 106/90 |

FOREIGN PATENT DOCUMENTS 52-224529 7/1977 Japan .

*Primary Examiner*—William R. Dixon, Jr.
*Assistant Examiner*—Paul Marcantoni
*Attorney, Agent, or Firm*—Celia H. Ketley; John J. Wasatonic; William L. Baker

[57] ABSTRACT

An additive combination for hydraulic cement compositions is provided which advantageously provides corrosion inhibition and set acceleration, in combination with a high level of fluidity and retention of fluidity over a desired period of time. The cement additive combination comprises an alkali or alkaline earth metal nitrite and a graft copolymer plasticizer comprising a polyether backbone and side chain polymers formed by polymerization of ethylenically unsaturated monomers.

Fluid hydraulic cement compositions are further provided comprising these additive combinations.

15 Claims, No Drawings

CORROSION INHIBITING HYDRAULIC CEMENT ADDITIVES AND COMPOSITIONS CONTAINING SAME

BACKGROUND OF THE INVENTION

This invention relates to additives for cement compositions. More particularly, this invention relates to corrosion inhibiting accelerators for hydraulic cements which combine a corrosion inhibitor with a graft copolymer plasticizer, and to cement compositions which use these additives to inhibit the corrosion of metal in contact with the cement.

Alkali and alkaline earth metal nitrites are well known as corrosion inhibiting additives for hydraulic cements. U.S. Pat. No. 3,427,175, for example, relates to Portland cement compositions containing from about 0.1 to 10 percent calcium nitrite based on the dry weight of Portland cement, and discloses that calcium nitrite inhibits corrosion of iron and steel reinforcing structures in the cement. Calcium nitrite is generally preferred over other alkali and alkaline earth metal nitrites, e.g. sodium nitrite, because it provides effective corrosion inhibition without a reduction in compressive strength or other deleterious effects.

When alkali or alkaline earth metal nitrites are used in hydraulic cement compositions in the concentrations generally necessary to achieve substantial corrosion inhibition, e.g. greater than 0.5% by weight of nitrite based on the weight of dry cement, the nitrite normally also provides a substantial level of set acceleration. This acceleration is advantageous, as unaccelerated cements generally require extended setting times, creating delays for the user. In some applications the level of set acceleration prvided by the calcium nitrite alone may be advantageous, (e.g. under cool conditions), while in other applications a slightly reduced level of acceleration may be more desirable (e.g. in warm weather applications). The addition of the nitrite also tends to reduce the slump, or plasticity, of the cement compositions such that the fluidity of the composition is lower initially, and is retained for a shorter time, making the composition more difficult to handle and allowing less working time in the interval prior to setting.

In the past, attempts have been made to increase the slump of cement compositions containing alkali or alkaline earth metal nitrites, and to increase the period of time during which these compositions retain their fluidity. One appraoch has been to add separately to the cement composition a plasticizer which is capable of increasing the initial slump and extending to a degree the period of time during which the composition remains fluid. However, a high level of the plasticizer is generally required in order to obtain these effects, and the addition of this large amount of plasticizer causes excessive retardation of the composition and significantly increases its cost. This practice further requires the cement producer or user to purchase, store and dispense two additives, with added inconvenience, labor and cost, and an increased opportunity for error or miscalculation in dispensing the proper respective amounts of the additives.

It has also been desired in some applications, as described above, to control the amount of acceleration provided by the nitrite, such that the setting time of the cement composition falls somewhere between that of an unaccelerated composition and that obtained when the nitrite alone is added to the composition. One approach used to obtain this effect has been to introduce to the composition an additive comprising the nitrite, water, and certain set retarders which form a soluble admixture with the water and nitrite, e.g. hydroxycarboxylic acids, alkali metal or alkaline earth metal salts thereof, or corn syrup, as disclosed in U.S. Pat. No. 4,466,834. This approach, while providing advantageous setting times, does not provide compositions having high initial slump without causing an undesirable level of retardation, nor does it extend the period of time during which the compositions remain fluid.

Thus an additive is desird which, when added to hydraulic cement compositions, will provide a desired level of corrosion inhibition and set acceleration, but will nonetheless provide a high level of initial fluidity to the cement slurry and a high level of retention of this fluidity for a desired period of time prior to the accelerated setting of the composition.

SUMMARY OF THE INVENTION

The present invention relates to an additive combination for hydraulic cement compositions which advantageously provides corrosion inhibition and set acceleration in combination with a high level of fluidity and retention of fluidity over a desired period of time. Accordingly, the present invention relates to a cement additive composition comprising an alkali or alkaline earth metal nitrite and a graft copolymer plasticizer comprising a polyether backbone and side chain polymers formed by polymerization of ethylenically unsaturated monomers.

The present invention is further directed to fluid hydraulic cement compositions comprising an alkali or alkaline earth metal nitrite and the graft copolymer plasticizer of this invention.

DETAILED DESCRIPTION OF THE INVENTION

In accordance with the present invention, it has been found that when an alkali or alkaline earth metal nitrite and certain graft copolymer plasticizers are added to hydraulic cements, cementitious compositions are provided which have superior fluidity, a high level of retention of fluidity over a desired period of time, and yet have advantageous accelerated setting times. Thus, this additive combination provides a unique combination of properties in the cement composition in that the setting time is decreased substantially but, prior to the accelerated setting, the composition has a high fluidity and a high level of retention of this fluidity. This contrasts favorably with previous accelerated compositions, in which the decreased setting time is accompanied by a lower fluidity which also decreases rapidly after initial mixing of the composition. In preferred embodiments of this invention, it has been found that the cement compositions retain at least 75% of their fluidity for a period of at least 45 minutes after the initial mixing, and have initial setting time accelerations of from about 1.5 to about 4 hours as compared to mixtues of equal fluidity or slump which do not contain the additive composition of the invention.

As used herein, the term "graft copolymer plasticizer" refers to the graft copolymers described herein which are capable of functioning as water reducing admixtures or superplasticizers, depending on the nature of the copolymer and the amount which is added to the cement composition. "Water reducing admixture"

and "superplasticizer" are terms of art which reference the relative water-reducing ability of a material. Water reducing admixtures provide a water reduction capability of 5% to 12% (ASTM C-494, Type A or Type D), while superplasticizers provide water reduction in excess of 12% (ASTM C-494 Type F or Type G). For brevity and convenience, the graft copolymers of the invention are referred to herein as plsticizers. This term includes both water reducing admixtures and superplasticizers as defined above.

The graft copolymer plasticizers of this invention are those described in U.S. Pat. No. 4,814,014, the disclosure of which is incorporated herein by reference. These graft copolymers comprise a polyether backbone having attached side chain copolymers formed by polymerization of ethylenically unsaturated monomers. Preferred graft copolymer plasticizers are those comprising a polyether backbone polymer having an average molecular weight of about 200 to 30,000; and about 2% to 40%, and preferably from 5% to 30% by weight of side chain polymers prepared by polymerization of an ethylenically unsaturated monomer. The backbone polymer may comprise a polyoxyalkylene, which may be selected from the group consisting of a polyoxyethylene, polyoxypropylene, or an oxyethylene/oxypropylene copolymer. In a preferred embodiment the polyoxyalkylene comprises terminal hydroxyl groups. Preferably the graft copolymer has an average molecular weight of less than about 50,000. (As used herein, the term "average molecular weight" refers to the number average molecular weight of the polymer as determined by gel permeation chromatography using a suitable solvent for the polymers, e.g. water, tetrahydrofuran, or N,N-dimethylformamide, and polyacrylic acid, polystyrene, or polyethylene oxide as a standard).

As used herein, the term "alkali metal nitrite" refers to any nitrite salt of the Group Ia elements, while the term "alkaline earth metal nitrite" refers to any nitrite salt of the Group IIa elements. Preferred nitrites are calcium nitrite, potassium nitrite and sodium nitrite. Most preferably the nitrite used is calcium nitrite.

The cement components in the cement compositions of the present invention are hydraulic cements, such as, for example Portland cement. These cements are conventionally known and are manufactured by calcining a mixture of limestone and clay to form a clinker, and then grinding the clinker to a fine powder. The cement compositions of the invention include concrete compositions comprising hydraulic cement, water, sand and coarse aggregate; cement pastes, comprising hydraulic cement and water, and mortars, comprising hydraulic cement, sand and water.

In order to facilitate addition and mixing of the calcium nitrite and graft copolymer with the cement composition, it is generally advantageous to add both together in the form of a single additive. However, if desired the two components could be added to the composition separation. The hydraulic cement composition may be in a dry powder form or mixed with water to form a plastic mix. It is generally preferred to add the additives of the invention to the cement in connection with preparation of an aqueous hydraulic cement slurry, i.e. with the mix water or as additives to the already formed slurry composition. The additives may, however, be added at an earlier stage, such as during the grinding of clinker to prepare the cement. The additives of the invention are preferably added to the cement in the form of an aqueous solution or dispersion.

The amount of the alkali or alkaline earth metal nitrite present in the hydraulic cement compositions of the invention will vary according to the requirements of the given application. The level of nitrite salt is generally at least about 0.25% of the dry weight of cement and the composition, preferably from about 0.5% to about 5%, and more preferably from about 1% to about 5%. The most preferable level within this range may be dictated by corrosion resistance requirements, the desired degree of acceleration, or economic considerations.

The amount of the graft copolymer plasticizer present in the hydraulic cement compositions will also vary according to the requirements of the given application. Higher levels of the requirements of the given application. Higher levels of the graft copolymer will produce maximum fluidity and maximum retention of fluidity, while lower levels provide good fluidity and fluidity retention, faster setting times and lower cost. The level of graft copolymer present is generally at least about 0.01% of the dry weight of cement in the composition, preferably from about 0.01% to 1.0%, and more preferably from about 0.05% to 0.6%.

The ratio of the nitrite salt to the graft copolymer plasticizer in the composition may also be varied according to the requirements of the given application. In accordance with the present invention, preferred ratios of graft copolymer to nitrite salt are from 1:19 to 1:3; particularly preferred ratios are within the range of 1:9 to 1:4.

In the additive compositions of the present invention, comprising the nitrite salt and the graft copolymer plasticizer, either as a dry mix or in an aqueous solution or dispersion, the blended additive will generally contain the same proportions of the two components as desired in the cement composition. Thus, since the ratio of the graft copolymer to the nitrite salt will generally be in the range of from 1:19 to 1:3 in the cement composition, the two components may also be blended in ratios of from 1:19 to 1:3 in the additive composition. In the embodiment in which the two components are provided in an aqueous carrier, the admixture may be prepared by blending respective aqueous solutions or dispersions of the nitrite salt and graft copolymer.

Other components may be added to the compositions of this invention in manners and amounts commonly known to those skilled in the art. Such components may include, for example, water reducing agents, air entraining or detraining agents, pozzolanic materials, and retarders. Such conventional agents can be used in known manner provided that they do not detract from the fluidity, acceleration or other desired properties.

The following examples are given for illustrative purposes only and are not meant to be of limiting effect. Unless otherwise indicated, all amounts in the following examples are weight percent, based on the total dry weight of the hydraulic cement binder in the composition.

EXAMPLE 1

A series of cement compositions was prepared, as shown in Table 1. The water to cement ratio for each was 0.4 and the cement factor was about 610 pounds/yd$^3$. To each composition, except for the control, 2.1% calcium nitrite was added. Compositions 3 and 4contained a graft copolymer plasticizer of the invention, wheeas composition 1 (the control) and composition 2 contained a plasticizer, (Daracem ® 100, commercially available from W. R. Grace & Co.-Conn.) at a level sufficient to produce a fluid mixture. The graft copolymer plasticizer used in the compositions was a polyether having grafted polyacrylic acid side chains, prepared as described inn Example 1 of U.S. Pat. No. 4,814,014. Each of the compositions contained sufficient air-entraining agent (Daravair M ® air-entraining agent sold by W. R. Grace & Co.-Conn.) to provide approximately 7% to 10% initial entratined air. Composition 2 also contained 0.15% of a lignosulfonate/glucose polymer retarder in order to prevent extremely rapid setting due to the presence of the calcium nitrite.

Slump was measured for each composition at 15 minute intervals according to ASTM C143. The initial and final setting times were also measured for each composition, according to ASTM C403. The setting times and slump values of the compositions are shown in Table 2.

The data of Table 2 demonstrates that when calcium nitrite is used in combination with relatively small amounts of a graft copolymer plasticizer according to the invention, cement compositions are produced which have a substantially accelerated setting time and yet also have a high initial fluidity and good retention of this fluidity. Moreover, even with the accelerated setting time, the initial fluidity of the composition and the retention of this fluidity in compositions 3 and 4 is superior to that of control composition 1, which is not accelerated and contains approximately four times as much plasticizer.

TABLE 1

| Composition | Calcium Nitrite | Graft Copolymer | Daracem ® 100 |
|---|---|---|---|
| 1 | — | — | 0.65 |
| 2 | 2.1 | — | 0.65 |
| 3 | 2.1 | 0.18 | — |
| 4 | 2.1 | 0.12 | — |

TABLE 2

| | Composition # | | | |
|---|---|---|---|---|
| | 1 | 2 | 3 | 4 |
| Slump (inches) | | | | |
| @ 15 mins | 6.0 | 6.0 | >10 | 8.5 |
| @ 30 mins | 3.5 | 3.5 | >10 | 8.0 |
| @ 45 mins | 2.0 | 2.0 | 7.75 | 7.75 |
| @ 60 mins | — | — | 5.5 | 2.25 |
| Setting Time (Hours) | | | | |
| Initial | 5.94 | <1 | 1.96 | 1.77 |
| Final | 7.21 | <2 | 3.12 | 2.47 |

What is claimed is:

1. A cementitious composition comprising:
   (a) hydraulic cement;
   (b) at least about 0.01 weight percent based upon the dry weight of said cement of a graft copolymer plasticizer comprising a polyether backbone and side chain polymers formed by polymerization of an ethylenically unsaturated monomer; and
   (c) at least about 0.01 weight percent based upon dry weight of said cement of an alkali or alkaline earth metal nitrite.

2. The composition of claim 1 wherein said polyether backbone has an average molecular weight of about 200 to 30,000, and said side chain polymers are present in an amount of from about 2 to 40 weight percent based upon the total weight of the graft copolymer.

3. A composition of claim 2 wherein said backbone polymer comprises a polyoxyalkylene.

4. A composition of claim 3 wherein said polyoxyalkylene is a polyoxyethylene, polyoxypropylene, or an oxyethylene/oxypropylene copolymer.

5. A composition of claim 3 wherein said polyoxyalkylene comprises terminal hydroxyl groups.

6. A composition of claim 2 wherein said graft copolymer contains about 5% to 30% by weight of said side chain polymers.

7. A composition of claim 1 wherein said graft copolymer has an average molecular weight of less than about 50,000.

8. A composition of claim 1 wherein said alkali or alkaline earth metal nitrite is calcium nitrite.

9. A composition of claim 1 comprising from about 0.01% to 1.0% by weight of said graft copolymer, based on the weight of said hydraulic cement.

10. A composition of claim 1 comprising from about 0.5% to about 5% by weight of said alkali or alkaline earth metal nitrite, based on the weight of said hydraulic cement.

11. A composition of claim 1 comprising from about 0.05% to 0.6% by weight of said graft copolymer, based on the weight of said hydraulic cement.

12. A composition of claim 1 wherein the weight ratio of graft copolymer to alkali or alkaline earth metal nitrite is from 1:19 to 1:3.

13. A composition of claim 1 wherein said hydraulic cement is Portland cement.

14. A composition of claim 1 wherein the composition retains at least 75% of its fluidity for a period of at least 45 minutes after the initial mixing.

15. A composition of claim 1 wherein the initial setting time is accelerated by from 1.5 to 4 hours as compared to a composition of equal fluidity which does not contain the graft copolymer or alkali or alkaline metal nitrite.

* * * * *

UNITED STATES PATENT AND TRADEMARK OFFICE
CERTIFICATE OF CORRECTION

PATENT NO. : 4,946,506

DATED : August 7, 1990

INVENTOR(S) : Arfael et al

It is certified that error appears in the above-identified patent and that said Letters Patent is hereby corrected as shown below:

Column 6, (claim 1) line 8, delete "0.01" and substitute --0.25--.

Signed and Sealed this

Twenty-fifth Day of August, 1992

*Attest:*

DOUGLAS B. COMER

*Attesting Officer*   Acting Commissioner of Patents and Trademarks